United States Patent
Ratasuk et al.

(10) Patent No.: US 8,447,344 B2
(45) Date of Patent: May 21, 2013

(54) UPLINK POWER CONTROL FOR CHANNEL AGGREGATION IN A COMMUNICATION NETWORK

(75) Inventors: Rapeepat Ratasuk, Hoffman Estates, IL (US); Amitabha Ghosh, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 373 days.

(21) Appl. No.: 12/972,956

(22) Filed: Dec. 20, 2010

(65) Prior Publication Data

US 2011/0237288 A1    Sep. 29, 2011

Related U.S. Application Data

(60) Provisional application No. 61/317,424, filed on Mar. 25, 2010.

(51) Int. Cl.
*H04Q 7/20* (2006.01)

(52) U.S. Cl.
USPC ............. 455/522; 455/69; 455/500; 455/517; 455/509; 455/515; 370/252; 370/310; 370/329; 370/328; 370/343

(58) Field of Classification Search
USPC ................ 455/522, 69, 127.1, 500, 517, 515, 455/509, 561, 512, 513, 507, 550.1, 422.1, 455/403, 426.1, 426.2, 445, 414.1–414.4; 370/252, 310, 329, 328, 343, 338
See application file for complete search history.

(56) References Cited

U.S. PATENT DOCUMENTS

| | | | |
|---|---|---|---|
| 7,447,516 B2 | 11/2008 | Heo et al. | |
| 2006/0229025 A1* | 10/2006 | Gandhi et al. | 455/69 |
| 2010/0015967 A1 | 1/2010 | Perets et al. | |
| 2010/0322090 A1* | 12/2010 | Zhang et al. | 370/252 |
| 2011/0038271 A1* | 2/2011 | Shin et al. | 370/252 |
| 2011/0170496 A1* | 7/2011 | Fong et al. | 370/329 |

OTHER PUBLICATIONS

Motorola: "ULPC: Simultaneous transmission of PUCCH and PUSCH in case of power limitation", 3GPP Draft; RI-I00201, 3RD Generation Partnership Project (3GPP), Mobile Competence Centre, 650, Route Des Lucioles, F-06921 Sophia-Antipolis Cedex, France,vol. RAN WGI, No. Valencia, Spain; 20100118, Jan. 12, 2010, all pages.

Motorola: "HUE Maximum Power Scaling", 3GPP Draft; R1-101542—UE Maximum Power Scaling, 3RD Generation Partnership Project (3GPP), Mobile Competence Centre, 650, Route Des Lucioles; F-06921 Sophia-Antipolis Cedex; France, vol. RAN WG1, ~o. San Francisco, USA; 20100222, Feb. 17, 2010, all pages.

(Continued)

*Primary Examiner* — Keith Ferguson

(57) ABSTRACT

A system and method for uplink power control for aggregated channels in a communication network includes a step 300 of defining power scaling parameters to be used to derive power scaling factors to be applied to associated aggregated uplink channels. A next step 302 includes providing the power scaling parameters to user equipment. A next step 304 includes applying power scaling factors derived from the power scaling parameters to the associated aggregated uplink channels when the user equipment will exceed a maximum transmit power.

12 Claims, 3 Drawing Sheets

OTHER PUBLICATIONS

Alcatel-Lucent Shanghai Bell et al: "PUSCH and PUCCH Power Scaling for Carrier Aggregation", 3GPP Draft; R1-100414 PUSCH and PUCCH Power Scaling for Carrier Aggregation, 3RD Generation Partnership Project (3GPP), Mobile Competence Centre; 650, Route Des Lucioles; F-06921 Sophia-Antipolis Cedex; France, vol. RAN WG1, no. Valencia, Spain; 20100118, Jan. 13, 2010, all pages.

Motorola: "Uplink Power Control for LTE-A", 3GPP Draft; R1-100178_ULPC_LTEA, 3RD Generation Partnership Project (3GPP), Mobile Competence Centre; 650, Route Des Lucioles; F-06921 Sophia-Antipolis Cedex; France, vol. RAN WG1, no. Valencia, Spain; 20100118, Jan. 12, 2010, all pages.

Samsung: "Power Scaling for UL TPC with Carrier Aggregation", 3GPP Draft; RI-I01148 TPC, 3RD Generation Partnership Project (3GPP), Mobile Competence Centre, 650, Route Des Lucioles, F-06921 Sophia-Antipolis Cedex, France, vol. RAN WGI, no. San Francisco, USA; 20100222, Feb. 16, 2010, all pages.

Patent Cooperation Treaty, International Search Report and Written Opinion of the International Searching Authority for International Application No. PCT/US2011/021831, Apr. 16, 2011, 18 pages.

Nokia Siemens Networks, Nokia: "Uplink Power Control for LTE-Advanced", 3GPP TSG RAN WG1 #58bis Meeting, R1-093906, Miyazaki, Japan, Oct. 12-16, 2009, all pages.

Ericsson, St-Ericsson: "Uplink Power Control for Carrier Aggregation", 3GPP TSG RAN WG1 Meeting #59bis, R1-100045, Valencia, Spain, Jan. 1-22, 2009, all pages.

Samsung: "UL TPC in Rel 10", 3GPP TSG RAN WG1 #59bis, R1-100100, Valencia, Spain, Jan. 19-23, 2010, all pages.

Nokia Siemens Networks, Nokia, "Uplink Power Control for LTE-Advanced", 3GPP TSG RAN WG1 #59bis Meeting, R1-100322, Valencia, Spain, Jan. 19-22, 2010, all pages.

Qualcomm Incorporated: "UL Power Control for Multicarrier Operation", 3GPP TSG RAN WG1 #59bis, R1-100677, Jan. 1-22, 2010, Valencia, Spain, all pages.

* cited by examiner

-PRIOR ART-

US 8,447,344 B2

UPLINK POWER CONTROL FOR CHANNEL AGGREGATION IN A COMMUNICATION NETWORK

TECHNICAL FIELD OF THE INVENTION

This invention relates generally to wireless communication systems and more particularly to uplink power control in a communication network.

BACKGROUND OF THE INVENTION

In the Long Term Evolution (LTE) communication network, user equipment (UE) can only transmit one physical uplink control channel or data channel at a time. However, in the proposed LTE-Advanced (LTE-A) communication system, with aggregate carriers and/or physical channels, simultaneous transmission on multiple carrier and/or channels is supported. In addition, in LTE-A, UEs can also transmit control and data channels simultaneously on the same carrier.

Referring to FIG. 1, two aggregate uplink carriers are shown in a LTE-A communication system, for example. Data channels and control channels are also represented. Since a UE can simultaneously transmit on both uplink carrier 1 and uplink carrier 2, the UE can send both control information and data at the same time. For these transmissions, the UE determines the transmit power for each channel based on known formulas that are specified by Third Generation Partnership Project (3GPP). However, in case of UE power limitation (i.e. the maximum UE transmission power is reached), there is currently no defined procedure for UE power control in LTE-A.

What is needed is a power scaling procedure for channel aggregation in the case of UE power limitation. It would also be of benefit if this procedure could be network-based.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

Skilled artisans will appreciate that common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENT

The present invention provides a network-based power scaling procedure for carrier and/or physical channel aggregation in the case of UE power limitation. In particular, an evolved NodeB (eNodeB) in the LTE-A communication network informs a UE of power limitation procedure to use when the UE exceeds its maximum transmit power. Specifically, the eNodeB informs the UE of a transmit scaling parameter to be used by the UE for each transmit channel.

Figure 1:
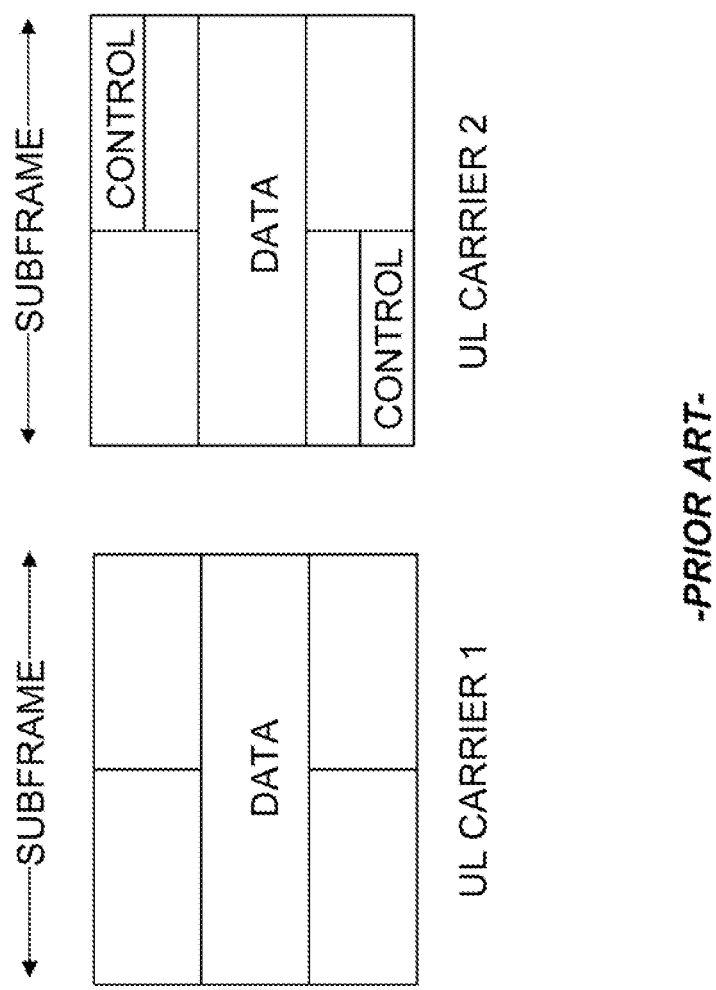
FIG. 1 illustrates aggregate uplink carrier subframe structures for a LTE-A communication network.
Figure 2:
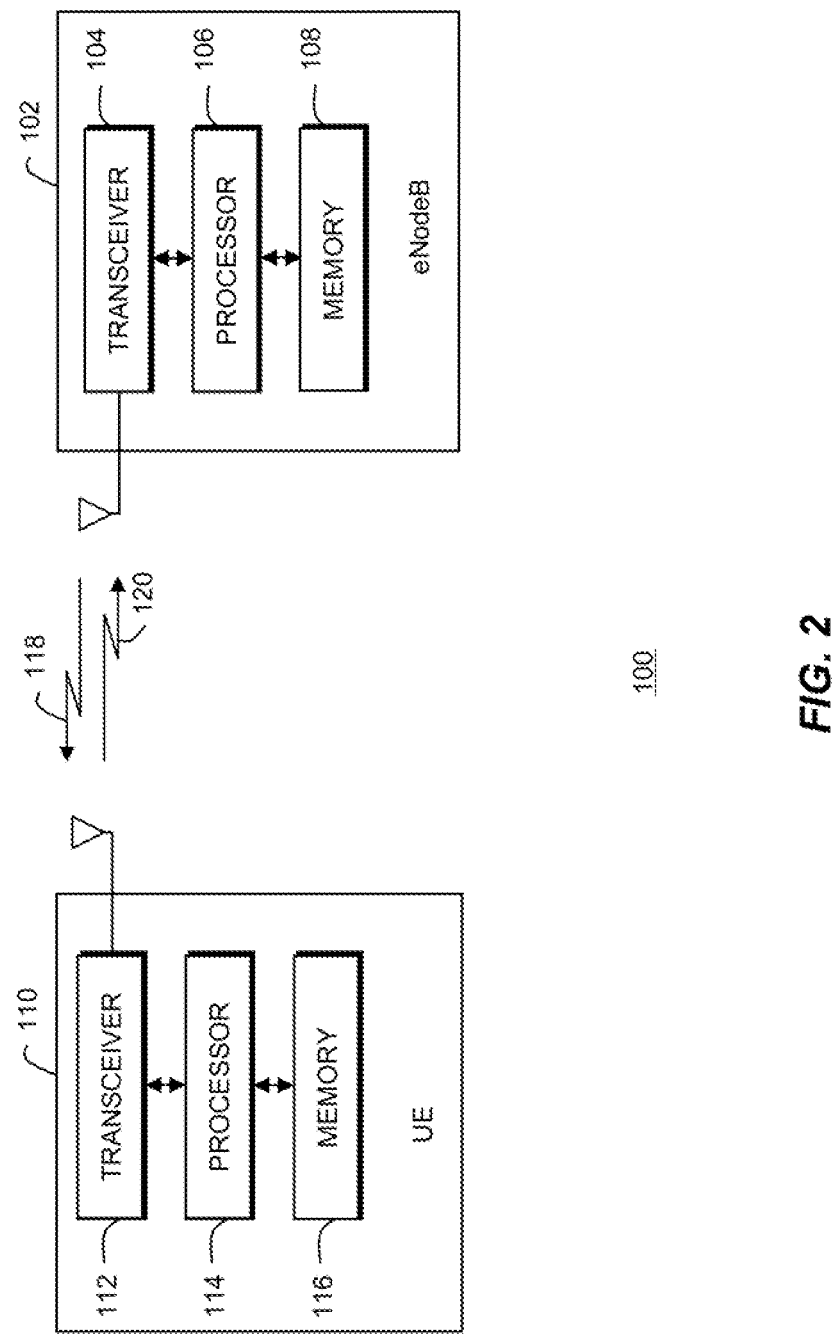
FIG. 2 is a block diagram of a communication system, in accordance with the present invention.

FIG. 2 is a simplified block diagram depiction of an LTE-A wireless communication system 100, in accordance with the present invention. However, it should be recognized that the present invention is also applicable to other OFDMA systems such as IEEE 802.xx-based systems, employing wireless technologies such as IEEE's 802.11, 802.16, or 802.20, modified to implement embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems.

Referring to FIG. 2, there is shown a simplified block diagram of an evolved NodeB (eNodeB) 102 in communication with one or more UE 110. Those skilled in the art will recognize that FIG. 2 does not depict all of the network equipment necessary for system to operate but only those system components and logical entities particularly relevant to the description of embodiments herein. For example, an eNodeB, access point, or base station can comprise one or more devices such as wireless area network stations (which include access nodes, Media Access Controllers (MAC), radio resource controllers (RRC), AP controllers, and/or switches), base transceiver stations, base site controllers (which include selection and distribution units), packet control functions, packet control units, and/or radio network controllers. In addition, user equipment (UE) or remote unit platforms are known to refer to a wide variety of consumer electronic platforms such as, but not limited to, mobile stations, subscriber equipment, mobile nodes, access terminals, terminal equipment, gaming devices, personal computers, and personal digital assistants, all referred to herein as UE. However, none of these other devices are specifically shown in FIG. 2.

The eNodeB 102 comprises a processor 106 coupled to a transceiver 104 and memory 108. UE 110 also comprises a processor 114 coupled to a transceiver 112 and memory 116. The transceivers of each can be connected to one or more antennas (one shown). In general, components such as processors and transceivers are well-known. For example, processing units are known to comprise basic components such as, but not limited to, microprocessors, microcontrollers, digital signal processors, memory devices, application-specific integrated circuits, and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, and/or a protocol specification, those skilled in the art are aware of the many design and development techniques available to implement a processor that performs the given logic. Therefore, eNodeB 102 and UE 110 both represent a known apparatus that has been adapted, in accordance with the description herein, to implement various embodiments of the present invention. The eNodeB 102 and UE 110 use a wireless interface for communication. The wireless interface corresponds to an uplink 120 and downlink 118, each comprising a group of channels and subchannels used in the implementation of various embodiments of the present invention.

Each UE 110 can provide simultaneous uplink signals 120 to the eNodeB 102 on one or more aggregate channels or carriers. Although the transmit power level for any individual channel is within a power control limit of 3GPP, it may be the case that the total transmit power of the UE is exceeded. Under 3GPP TS 36.213, the power of each channel (e.g. PUCCH or PUSCH) transmitted by the UE is directed by the eNodeB. The total transmit power, $P_t$, requested of a UE using channel aggregation is given by $$P_t = \sum_i \{P_{PUCCH,i} + P_{PUSCH,i}\} \qquad (Eq. 1)$$

where $P_{PUCCH,i}$ is the uplink transmit power directed by the network for the physical uplink control channel (PUCCH) on component carrier index i, $P_{PUSCH,i}$ is the uplink transmit power directed by the network for the physical uplink shared channel (PUSCH) on component carrier index i, and $P_{CMAX}$ is the total available UE transmit power. However, in 3GPP TS 36.213 there is no limit to the power level on each channel in case of transmissions on multiple channels, and 3GPP TS 36.213 currently provides no direction to the UE for the case where the requested $P_t$ exceeds $P_{CMAX}$.

The present invention proposes to use power scaling for each channel to provide a total transmit power, $P_t$, of a UE using channel aggregation given by $$P_t = \sum_i \gamma\{k_{PUCCH,i} P_{PUCCH,i} + k_{PUSCH,i} P_{PUSCH,i}\} \leq P_{CMAX} \qquad (Eq. 2)$$

where $k_{PUCCH,i}$ is the nominal scaling factor for the PUCCH on component carrier index i, and $k_{PUSCH,i}$ is the nominal scaling factor for the PUSCH on component carrier index i, and $\gamma$ is the overall power reduction parameter to keep the power below $P_{CMAX}$. The parameter $\gamma$ is calculated at the UE by $$\gamma = P_{CMAX} \Big/ \sum_i \{k_{PUCCH,i} P_{PUCCH,i} + k_{PUSCH,i} P_{PUSCH,i}\} \qquad (Eq. 3)$$

In practice, the UE calculates the power each uplink channel needs before transmission, and if the sum of the uplink channel powers exceeds $P_{CMAX}$, then the UE will scale each channel's power by its given respective scaling factor until $P_t \leq P_{CMAX}$. In this case, the UE will scale the transmit power of each channel according to the nominal scaling parameters ($k_{PUCCH,i}$ and $k_{PUSCH,i}$) and the power reduction factor $\gamma$ calculated at the UE. Alternatively, power scaling can be accomplished with a single uniform scaling factor on component carrier index i, $k_i$, by $$P_t = \sum_i \gamma\{k_i P_{PUCCH,i} + k_i P_{PUSCH,i}\} \leq P_{CMAX} \qquad (Eq. 4)$$

The power reduction factors are calculated at the UE based on either predefined rules or nominal scaling parameters or priority weights assigned to different channels and component carriers by the eNodeB. The eNodeB will inform the UE of power allocation procedure or strategy by sending the UE a scaling parameter for each channel that defines either the predefined rules or priority weights assigned to the different channels and component carriers. The scaling parameters can be provided by the eNodeB to the UE once at UE registration (statically), at occasional periods (semi-statically) using newly defined MAC or RRC messages, or sent at every uplink scheduling in order to provide dynamic uplink power control. In particular, the scaling parameters may be sent semi-statically in a MAC message, via RRC signaling, or dynamically via physical downlink control channel (PDCCH) assignment. Scaling parameters can be sent in a message using a new control channel format or though the reuse of an existing format. It should be recognized that several strategies can be predefined to limit the amount of information being transmitted in this message, and that scaling parameters may be system-wide or user-specific to allow individual differentiation.

In the example of Eq. 3, the eNodeB can provide a simple one-bit scaling parameter to the UE. The one-bit scaling parameter can tell the UE to either turn power scaling ON or OFF (e.g. $k_{PUCCH,i}=0$ or 1). If the one-bit scaling parameter directs the UE to turn scaling ON, the UE can then calculate the scaling factor for $P_{PUCCH,i}$ and $P_{PUSCH,i}$ on each component carrier index as follows. The UE will first use Eq. 1 to determine if the sum of the power levels directed by the eNodeB, $P_{PUCCH,i}$ and $P_{PUSCH,i}$, exceeds the UE's maximum transmit power capacity for that component carrier index. If this is the case, the UE will then derive the scaling factor as $k_i \leq P_{CMAX}/P_t$ for each component carrier index i and apply that scaling factor to its transmission of PUCCH and PUSCH as in Eq. 3. Optionally, a two-bit scaling parameter can be supplied by the eNodeB to the UE. For example, a scaling parameter "00" tells the UE to turn scaling OFF, "01" directs the UE to apply a different scaling factor per each component carrier index (as described above), "10" directs the UE to apply a uniform scaling parameter, k (instead of $k_i$), across all channels, and "11" directs the UE to apply a different scaling factor per each channel.

In the present invention, several other scaling strategies can be considered by the eNodeB. Firstly, the scaling parameters can be chosen such that the UE maintains a prioritized required power on an uplink control channel, i.e. $k_{PUCCH,i}=1$ (no nominal power scaling), while reducing power on an uplink data channel, such as PUSCH where the power could be scaled down to $k_{PUSCH,i}=0$ (power scaling of 0% corresponding to no transmission). In this case, only the control channel will be transmitted as the power of the data channel is scaled down to zero. In another example, the UE can select $k_{PUCCH,i}=1$ (no nominal power scaling) for the control channel and $k_{PUSCH,i}=0.5$ (nominal power scaling of 50%) for the data channel. Using (Eq. 3), the parameter $\gamma$ is calculated at the UE according to $$\gamma = P_{CMAX} \Big/ \sum_i \{P_{PUCCH,i} + 0.5 P_{PUSCH,i}\}$$

and applied according to (Eq. 2). For illustrative purpose, consider transmission of PUCCH and PUSCH on a single uplink carrier where both channels have the same power P. Using the previous example, the UE calculates $\gamma = P_{CMAX}/(1.5 P)$ and applies scaling factors $\gamma \times k_{PUCCH,i}$ and $\gamma \times k_{PUSCH,i}$ to the control and data channel, respectively. In this case, it will allocate 33% of the maximum transmit power to the PUSCH and 67% of the maximum transmit power to the PUCCH.

Secondly, the scaling parameters can include an eNodeB-defined priority list and can direct the UE to drop (e.g. k=0) certain transmissions based on the eNodeB-defined priority list. For example, the priority list may be based on the type of control information to be transmitted. In general ACK/NACK has the highest priority, followed by Scheduling Request Indicator (SRI), Channel Quality Indicator (CQI), Precoding Matrix Indicator (PMI), and Rank Indicator (RI). As an example, normal scaling factor ($k_{PUCCH,i}$) of 1.0, 1.0, 0.8, 0.8, 0.8 may be assigned to PUCCH transmission containing ACK/NACK, SRI, CQI, PMI, and RI, respectively. On the PUSCH, the eNB may also prioritized data re-transmission over initial transmission when both types are data are being transmitted. It may also prioritize types of message, for instance buffer status report or power headroom report, over data transmission.

Thirdly, the scaling parameters can be chosen to proportionally reduce UE transmit power based on quality-of-service QoS requirements. Optionally, this can be done based on the carriers being used, to allow QoS differentiation via carrier. For example, consider a deployment with two uplink carriers where the second carrier is for best-effort traffic and the first carrier is for voice traffic. In this case, nominal scaling factor of 0.5 may be assigned to PUSCH on the first carrier ($k_{PUSCH,1}$=0.5) and nominal scaling factor of 0.0 may be assigned to PUSCH on the second carrier ($k_{PUSCH,2}$=0.0). In case of data transmission on both carriers where the maximum power is exceeded, the UE will then drop data transmission on the second carrier. As another example, consider $k_{PUSCH,1}$=0.5 and $k_{PUSCH,2}$=0.1. In this case, data transmission on the second carrier will have a nominal power scaling factor that is five times greater than that on the first carrier. Note that the actual transmit power will depend on $P_{PUSCH,1}$ and $P_{PUSCH,2}$ which is determined at the UE based on power-control parameters provided by the eNB.

Similar scaling can be done in HetNet scenarios where two carriers (C1 and C2) are assigned to a macrocell and one carrier (C2 which is a subset of macro cell carrier) is assigned to a femto cell. When a UE not belonging to closed subscriber group (CSG) is in the coverage area of a femto cell and connected to carriers C1 and C2 of the macro cell, it will be transmitting at maximum power and creating interference to the femto cell on C2. In this case, the UE should drop the transmission on carrier C2 so that the interference to the femto cell is reduced.

Fourthly, the scaling parameters can be chosen to proportionally reduce transmit power based on one or more performance metrics (e.g. block error rate, decoding metrics, power headroom reports, handover measurement reports, etc.). For example, the nominal power scaling factor can be given by $k_{PUSCH,1}$=[β×f(performance metric)] where β≧0 is the baseline reduction factor and f(performance metric) is a mathematical function whose input is a performance metric. Examples of performance metrics include block error rate, Turbo decoder reliability metric, CQI reports, power headroom, etc. One example of how the scaling parameter can be based on past performance would be to use $k_{PUSCH,i}$=[β×(1−BLERavg)] where the higher the average BLER (determined over the past N transmission), the lower the $k_{PUSCH,i}$ and thus the higher the power scaling factor. Another example of how the scaling parameter can be based on past performance would be to use $k_{PUSCH,i}$=[β×f(CQIavg−Threshold)] where f(x) is a step function (i.e. f(x)=1 if x>0 and 0 if x≦0). Here, if the average CQI values (determined over the past M reports) is lower than a threshold, then nominal power scaling of 0% (i.e. channel is turned OFF) is applied.

Fifthly, the scaling parameters and factors can be chosen based on UE traffic type. Transmission on the data channel may be prioritized based on QoS Class Identifier (QCI) or data traffic type. In case of differentiation by QCI, the eNB can inform the UE of the scaling parameters for different QCI classes. In addition, delay sensitive traffic such as VoIP or video streaming can be given priority over delay insensitive traffic such as FTP or TCI/IP. As an example, nominal scaling factor ($k_{PUSCH}$) of 0.5 and 0.0 may be assigned to PUSCH transmission containing VoIP and FTP, respectively. In some cases, information about traffic type is available to the eNB, for example, based on user service agreement or information from the application layers. In other cases, this information is not available and the eNB is required to estimate the uplink traffic type based on, for example, traffic pattern, QCI, and downlink traffic.

In all of the above cases, scaling can be applied as either; i) uniform scaling where a single scaling factor is applied to all channels in order to limit the total transmit power, ii) per component carrier scaling where a scaling factor is applied to each component carrier, or iii) per channel scaling where scaling factors $k_{PUCCH,i}$ and $k_{PUSCH,i}$ are separately applied to the PUCCH and PUSCH channels within each component carrier.

Figure 3:
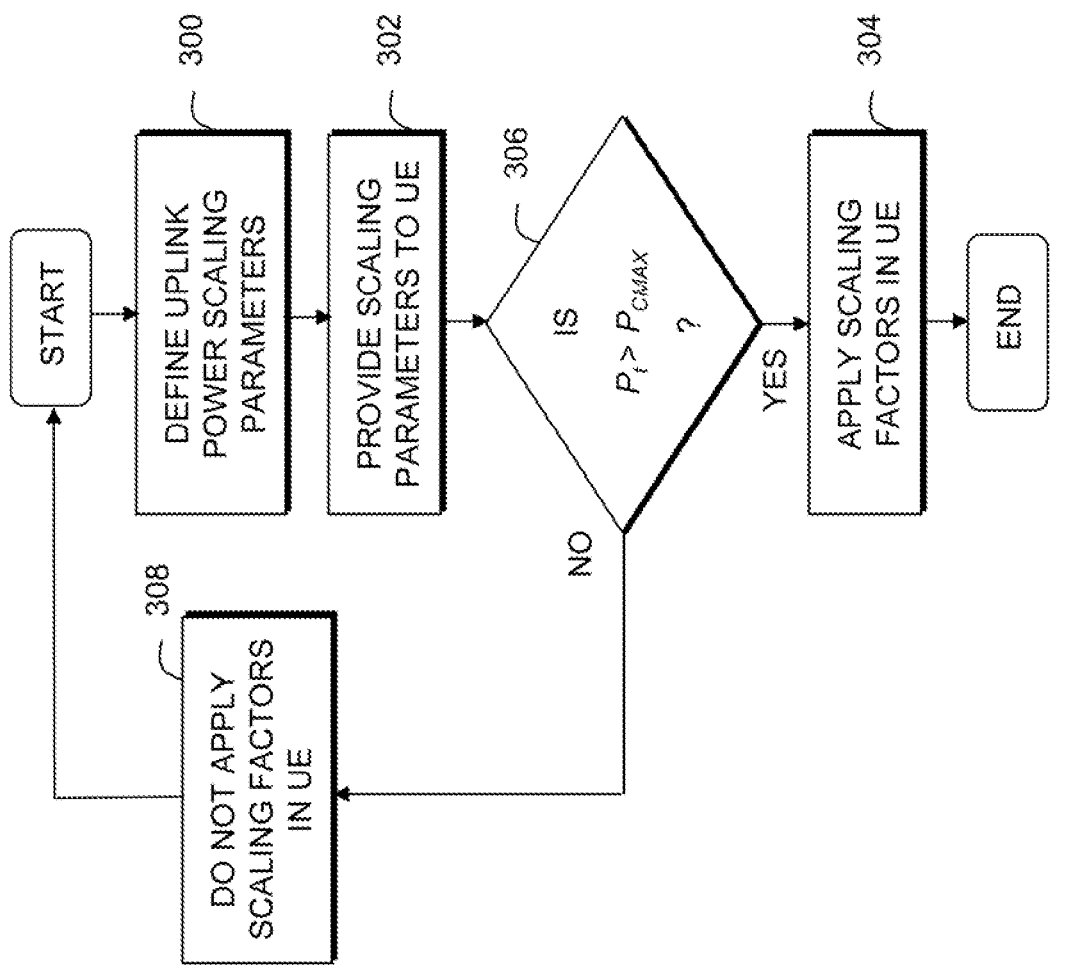
FIG. 3 illustrates a flow chart for a method, in accordance with the present invention.

Referring to FIG. 3, the present invention also provides a method for uplink power control for aggregated channels and/or carriers in a communication network. The method includes a first step 300 of an eNodeB processor defining power scaling parameters to be used by the UE processor to derive power scaling factors to be applied to associated aggregated uplink channels by a processor of the UE. Scaling parameters can be chosen by the eNodeB processor; a) to maintain a required power on an uplink control channel while reducing power on an uplink data channel, b) to direct the UE to drop certain transmissions based on a provided eNodeB-defined priority list, c) to proportionally reduce transmit power based on a quality-of-service requirement, either across all aggregated UL channels or individually for each UL channel, d) to proportionally reduce transmit power based on past performance, or e) based on UE traffic type. In addition, scaling parameters can be based on carrier type in a heterogeneous network. Further, the carrier type can be based on an eNB type (e.g. macrocell, picocell, femtocell, relay, and home eNB).

A next step 302 includes the eNodeB transceiver, under control of the eNodeB processor, providing the power scaling parameters to user equipment processor through its associated transceiver. The power scaling parameters can be provided in a MAC message, RRC signaling, or PDCCH assignment.

A next step 304 includes the UE processor applying power scaling factors derived from the power scaling parameters to the associated aggregated uplink channels and/or carriers for transmission by the UE transceiver, when the user equipment processor determines that the transceiver power will exceed a maximum transmit power 306, and otherwise using no scaling factors 308 on the aggregated uplink channels and/or carriers. In this step, scaling can be applied as either; i) uniform scaling where a single scaling factor is applied to all channels in order to limit the total transmit power, ii) per-component carrier scaling where a different scaling factor is applied to each component carrier, or iii) per-channel scaling where scaling factors $k_{PUCCH,i}$ and $k_{PUSCH,i}$ are separately applied to the PUCCH and PUSCH channels within each component carrier.

It will be understood that the terms and expressions used herein have the ordinary meaning as is accorded to such terms and expressions by persons skilled in the field of the invention as set forth above except where specific meanings have otherwise been set forth herein.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including use of hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

While the invention may be susceptible to various modifications and alternative forms, a specific embodiment has been shown by way of example in the drawings and has been described in detail herein. However, it should be understood that the invention is not intended to be limited to the particular forms disclosed, and can be applied equally well to any communication system that can use real-time services. Rather, the invention is to cover all modification, equivalents and alternatives falling within the scope of the invention as defined by the following appended claims.

What is claimed is:

1. A method for uplink power control for aggregated channels in a communication network, the method comprising the step of:
defining power scaling parameters to be used to derive power scaling factors to be applied to associated aggregated uplink channels;
providing the power scaling parameters to user equipment; and
applying power scaling factors derived from the power scaling parameters to the associated aggregated uplink channels when the user equipment will exceed a maximum transmit power;
wherein defining includes an eNodeB-defined priority list and can direct the UE to drop certain transmissions based on the eNodeB-defined priority list.

2. The method of claim 1, wherein the providing step includes providing the power scaling parameters in a MAC message.

3. The method of claim 1, wherein the providing step includes providing the power scaling parameters in RRC signaling.

4. The method of claim 1, wherein the providing step includes providing the power scaling parameters in a PDCCH assignment.

5. The method of claim 1, wherein the defining step includes choosing scaling parameters to maintain a required power on an uplink control channel while reducing power on an uplink data channel.

6. The method of claim 1, wherein the defining step includes choosing the scaling parameters to proportionally reduce transmit power based on a quality-of-service requirement.

7. The method of claim 6, wherein the quality of service requirement is different for different channels being used.

8. The method of claim 1, wherein the defining step includes choosing the scaling parameters to proportionally reduce transmit power based on one or more performance metrics.

9. The method of claim 1, wherein the defining step includes choosing the scaling parameters based on UE traffic type.

10. The method of claim 1, wherein the scaling factors can be applied as a uniform scaling where a single scaling factor is applied to all channels.

11. The method of claim 1, wherein the defining step includes choosing the scaling parameters based on carrier type in a heterogeneous network.

12. The method of claim 11, wherein the carrier type is based on eNB type.

* * * * *